(12) United States Patent
Yamada et al.

(10) Patent No.: US 9,569,705 B2
(45) Date of Patent: Feb. 14, 2017

(54) METHOD AND SYSTEM FOR CONFIGURING PRINT CHARACTER INFORMATION

(71) Applicant: Seiko Epson Corporation, Tokyo (JP)

(72) Inventors: Yusuke Yamada, Matsumoto (JP); Takuya Sugimoto, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 58 days.

(21) Appl. No.: 14/490,195

(22) Filed: Sep. 18, 2014

(65) Prior Publication Data

US 2015/0077767 A1 Mar. 19, 2015

(30) Foreign Application Priority Data

Sep. 18, 2013 (JP) .................................. 2013-193168

(51) Int. Cl.
G06K 15/02 (2006.01)
G06F 3/12 (2006.01)
G06K 15/00 (2006.01)

(52) U.S. Cl.
CPC ......... G06K 15/1843 (2013.01); G06F 3/1208 (2013.01); G06F 3/1237 (2013.01); G06F 3/1285 (2013.01); G06K 15/007 (2013.01); G06K 15/1807 (2013.01)

(58) Field of Classification Search
None
See application file for complete search history.

(56) References Cited

U.S. PATENT DOCUMENTS

| | | | | |
|---|---|---|---|---|
| 5,671,341 A | * | 9/1997 | Kashiwazaki ......... | G06K 15/00 358/1.13 |
| 6,882,344 B1 | * | 4/2005 | Hayes et al. .................. | 345/467 |
| 6,940,615 B1 | * | 9/2005 | Shima .................. | G06F 3/1206 358/1.15 |
| 7,797,631 B2 | * | 9/2010 | Yoshida ........................ | 715/269 |
| 2005/0270553 A1 | * | 12/2005 | Kawara ........................ | 358/1.13 |
| 2007/0202473 A1 | * | 8/2007 | Koda et al. .................... | 434/118 |
| 2012/0002226 A1 | * | 1/2012 | Zhan .............................. | 358/1.11 |
| 2012/0110438 A1 | * | 5/2012 | Peraza et al. ................. | 715/243 |
| 2012/0274953 A1 | * | 11/2012 | Makabe ................. | B41J 11/663 358/1.5 |

FOREIGN PATENT DOCUMENTS

| | | |
|---|---|---|
| JP | 08-034142 A | 2/1996 |
| JP | 2004-126311 A | 4/2004 |
| JP | 2004-295367 A | 10/2004 |
| JP | 2006-103045 A | 4/2006 |
| JP | 2011-081713 A | 4/2011 |

* cited by examiner

*Primary Examiner* — Ming Hon
(74) *Attorney, Agent, or Firm* — Nutter McClennen & Fish LLP; John J. Penny, Jr.; Ashley T. Brzezinski

(57) ABSTRACT

The size of text printed based on font data can be adjusted. A printer has: a print unit that prints an image on a recording medium; a storage unit that stores a font table containing font data for characters, and stores adjustment ratio information specifying a ratio used to scale the size of the font data stored in the font table; a first communication unit that receives print instruction data including information specifying a character; a second communication unit that receives a change instruction instructing changing a ratio specified by the adjustment ratio information; and a control unit that scales the font data of the specified character at the ratio specified by the adjustment ratio information, and controls the print unit to print the character based on the scaled font data.

13 Claims, 7 Drawing Sheets

KT

| | MODEL K1 | MODEL K2 | MODEL K3 |
|---|---|---|---|
| FONT A | VERTICAL RATIO: 1.2X<br>HORIZONTAL RATIO:1.2X | VERTICAL RATIO: 1.0X<br>HORIZONTAL RATIO:0.8X | VERTICAL RATIO: 0.9X<br>HORIZONTAL RATIO:1.2X |
| FONT B | VERTICAL RATIO: 0.9X<br>HORIZONTAL RATIO:0.9X | VERTICAL RATIO: 1.6X<br>HORIZONTAL RATIO:1.8X | VERTICAL RATIO: 2.7X<br>HORIZONTAL RATIO:3.0X |
| FONT C | VERTICAL RATIO: 1.2X<br>HORIZONTAL RATIO:1.0X | VERTICAL RATIO: 1.3X<br>HORIZONTAL RATIO:1.2X | VERTICAL RATIO: 2.0X<br>HORIZONTAL RATIO:1.8X |

FIG. 5

METHOD AND SYSTEM FOR CONFIGURING PRINT CHARACTER INFORMATION

Priority is claimed under 35 U.S.C. §119 to Japanese Application No. 2013-193168 filed on Sep. 18, 2013, which is hereby incorporated by reference in its entirety.

BACKGROUND

1. Technical Field

The present disclosure relates to a printer capable of printing images on recording media, and to a control system including the printer and an information processing device.

2. Related Art

JP-A-H08-034142 discloses a printer that stores font data internally. When a print job that specifies a particular font is received from a host computer or other control device, for example, the printer disclosed in JP-A-H08-034142 prints text using the internal font data.

When a printer prints text based on font data as described above, there is also a need to be able to adjust the size of the characters printed on the recording medium by adjusting the size of the font data without depending on control by the control device.

SUMMARY

A printer and a control system according to the present disclosure can adjust the size of characters printed based on font data.

One aspect of at least one embodiment of the present invention is a printer including: a print unit that prints an image on a recording medium; a storage unit that stores a font table containing font data for characters, and stores adjustment ratio information specifying a ratio used to scale the size of the font data stored in the font table; a first communication unit that receives print instruction data including information specifying a character; a second communication unit that receives a change instruction instructing changing a ratio specified by the adjustment ratio information; and a control unit that scales the font data of the specified character at the ratio specified by the adjustment ratio information, and controls the print unit to print the character based on the scaled font data.

In this aspect of at least one embodiment of the present invention, the printer stores adjustment ratio information including the ratio used to scale the size of font data stored in a font table. The printer receives print instruction data including information specifying a character, scales the font data for the specified character according to the ratio specified by the adjustment ratio information, and then prints based on the font data resulting from the scaling operation. As a result, by adjusting the ratio specified by the adjustment ratio information, the size of the character printed based on the font data can be adjusted.

Preferably, the storage unit stores a font table for each font, and stores adjustment ratio information for each font; the print instruction data includes information specifying a font; and the control unit scales the font data of the specified character stored in the font table of the specified font at the ratio specified by the adjustment ratio information, and controls the print unit to print based on the scaled font data.

This configuration enables adjusting the size of a character printed based on font data according to the specific font.

Preferably in another aspect of at least one embodiment of the present invention, the print instruction data includes character size information specifying the printed size of the specified character; and the control unit adjusts the size of the font data scaled at the ratio specified by the adjustment ratio information based on the character size information, and controls the print unit to print the character based on the adjusted font data.

This configuration enables adjusting the size of text based on the character size information contained in the print instruction data after adjusting the size of the font data based on the adjustment ratio information.

Further preferably, the second communication unit receives a change instruction instructing changing the ratio specified by the adjustment ratio information from an information processing device that connects to and communicates with the second communication unit; and the control unit changes the ratio specified by the adjustment ratio information based on the change instruction.

This configuration enables desirably changing the adjustment ratio specified by the adjustment ratio information from the information processing device.

Further preferably, the storage unit stores adjustment ratio information according to the model of another printer to be emulated; and the control unit has a function for emulating the other printer, and controlling the print unit to print based on the print instruction data related to controlling the other printer, and when the second communication unit receives selection of a model of other printer and the change instruction from the information processing device, sets the adjustment ratio information corresponding to the selected model as the adjustment ratio information to be used.

Using the ability of the control unit to emulate another printer, this configuration can scale font data using a ratio appropriate to the model of the other printer that is emulated.

Yet further preferably, a web browser is installed on the information processing device; and the control unit sends display data for displaying a user interface that accepts selection of a model to the web browser of the information processing device when accessed from the web browser of the information processing device.

Without needing to install a dedicated software tool, for example, this configuration enables the user to use an information processing device having an installed web browser to specify the model of printer being emulated.

Another aspect of at least one embodiment of the present invention is a control system including a host computer; an information processing device; and a printer. The printer includes a print unit that prints an image on a recording medium; a storage unit that stores a font table containing font data for characters, and stores adjustment ratio information specifying a ratio used to scale the size of the font data stored in the font table; a first communication unit that receives print instruction data including information specifying a character from the host computer; a second communication unit that receives a change instruction instructing changing a ratio specified by the adjustment ratio information from the information processing device; and a control unit that scales the font data of the specified character stored in the font table for the specified font at the ratio specified by the adjustment ratio information, and controls the print unit to print the character based on the scaled font data.

Preferably in this control system, the storage unit of the printer stores a font table for each font, and stores adjustment ratio information for each font; the print instruction data includes information specifying a font; and the control unit of the printer scales the font data of the specified character stored in the font table of the specified font at the ratio specified by the adjustment ratio information, and controls the print unit to print based on the scaled font data.

In another aspect of this control system, the print instruction data includes character size information specifying the printed size of the specified character; and the control unit of the printer adjusts the size of the font data scaled at the ratio specified by the adjustment ratio information based on the character size information, and controls the print unit to print the character based on the adjusted font data.

In another aspect of this control system, the second communication unit of the printer receives a change instruction instructing changing the ratio specified by the adjustment ratio information from an information processing device that connects to and communicates with the second communication unit; and the control unit of the printer changes the ratio specified by the adjustment ratio information based on the change instruction.

In this aspect of at least one embodiment of the present invention, the printer stores adjustment ratio information including the ratio used to scale the size of font data stored in a font table. The printer receives print instruction data including information specifying a character, scales the font data for the specified character according to the ratio specified by the adjustment ratio information, and then prints based on the font data resulting from the scaling operation. As a result, by adjusting the ratio specified by the adjustment ratio information, the size of the character printed based on the font data can be adjusted. The adjustment ratio specified in the adjustment ratio information can also be desirably adjusted from the information processing device.

Preferably, the storage unit of the printer stores adjustment ratio information for each font according to the model of another printer to be emulated; the control unit of the printer has a function for emulating another printer, and controlling the print unit to print based on the print instruction data related to controlling the other printer; the information processing device sends a selection of a model of another printer with the change instruction to the printer; and the control unit of the printer sets the adjustment ratio information corresponding to the selected model as the adjustment ratio information to be used when the second communication unit receives selection of a model of other printer and the change instruction from the information processing device.

Using the ability of the control unit to emulate another printer, this configuration can scale font data using a ratio appropriate to the model of the other printer that is emulated.

Further preferably, the printer functions as a web server to the information processing device, and sends display data for displaying a user interface that accepts selection of a model to the information processing device when accessed from the information processing device; a web browser is installed on the information processing device; and when the display data is received from the printer, displays the user interface based on the received display data.

Without needing to install a dedicated software tool, for example, this configuration enables the user to use an information processing device having an installed web browser to specify the model of printer being emulated.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 shows an example of an adjustment ratio table.

DESCRIPTION OF EMBODIMENTS

Some embodiments of the present invention are described below with reference to the accompanying figures.

Figure 1:
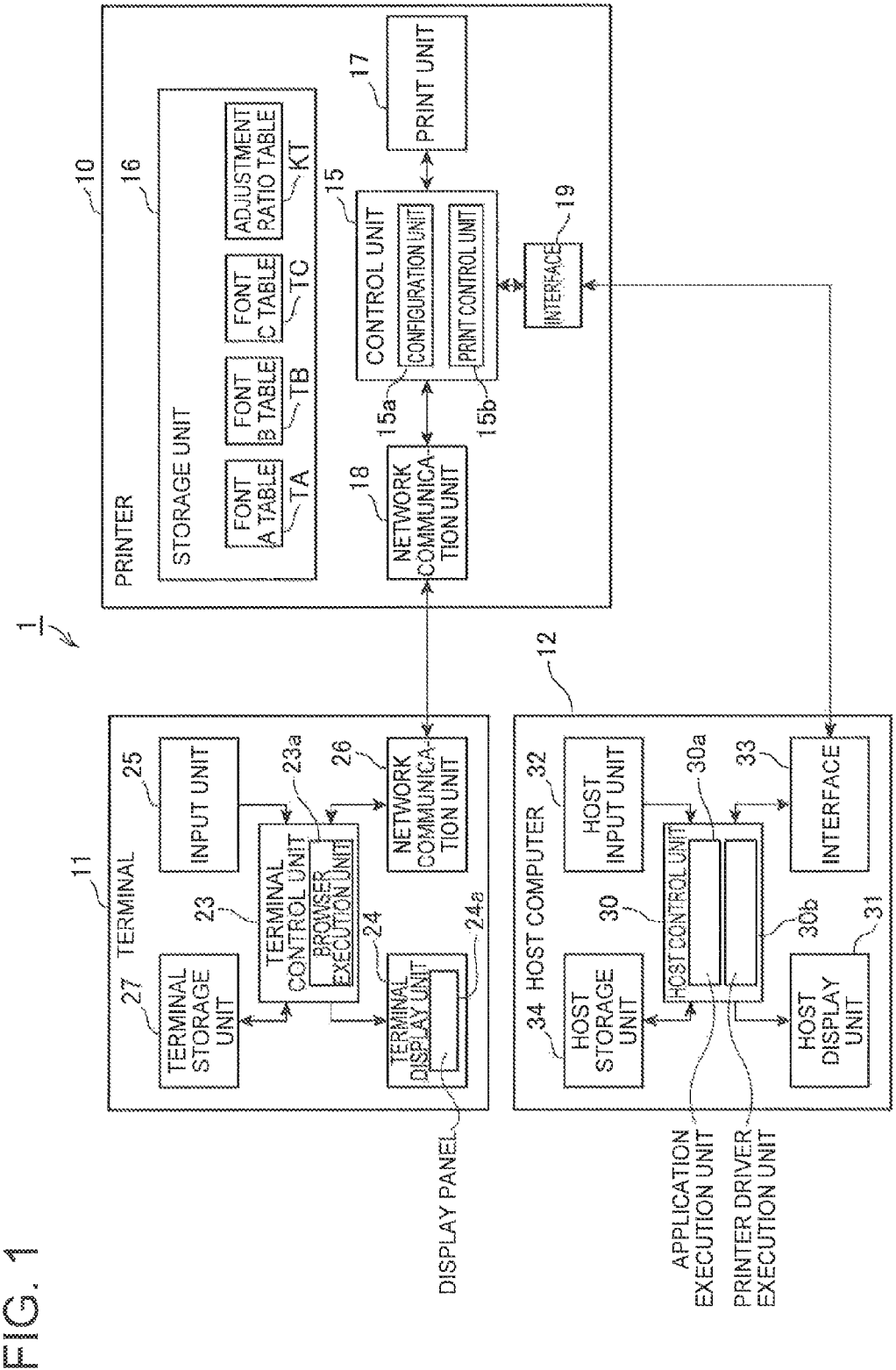
FIG. 1 is a block diagram illustrating the configuration of a control system according to some embodiments of the invention.

FIG. 1 is a block diagram showing the functional configuration of a control system 1 according to embodiments of the invention.

As shown in FIG. 1, the control system 1 includes a printer 10 (printing device), and a terminal 11 (information processing device) and host computer 12 are connected to and can communicate with the printer 10.

The printer 10 in some embodiments of the invention is an inkjet printer, and is capable of color printing. More particularly, the printer 10 according to this embodiment can handle and print on label paper R.

Figure 2:
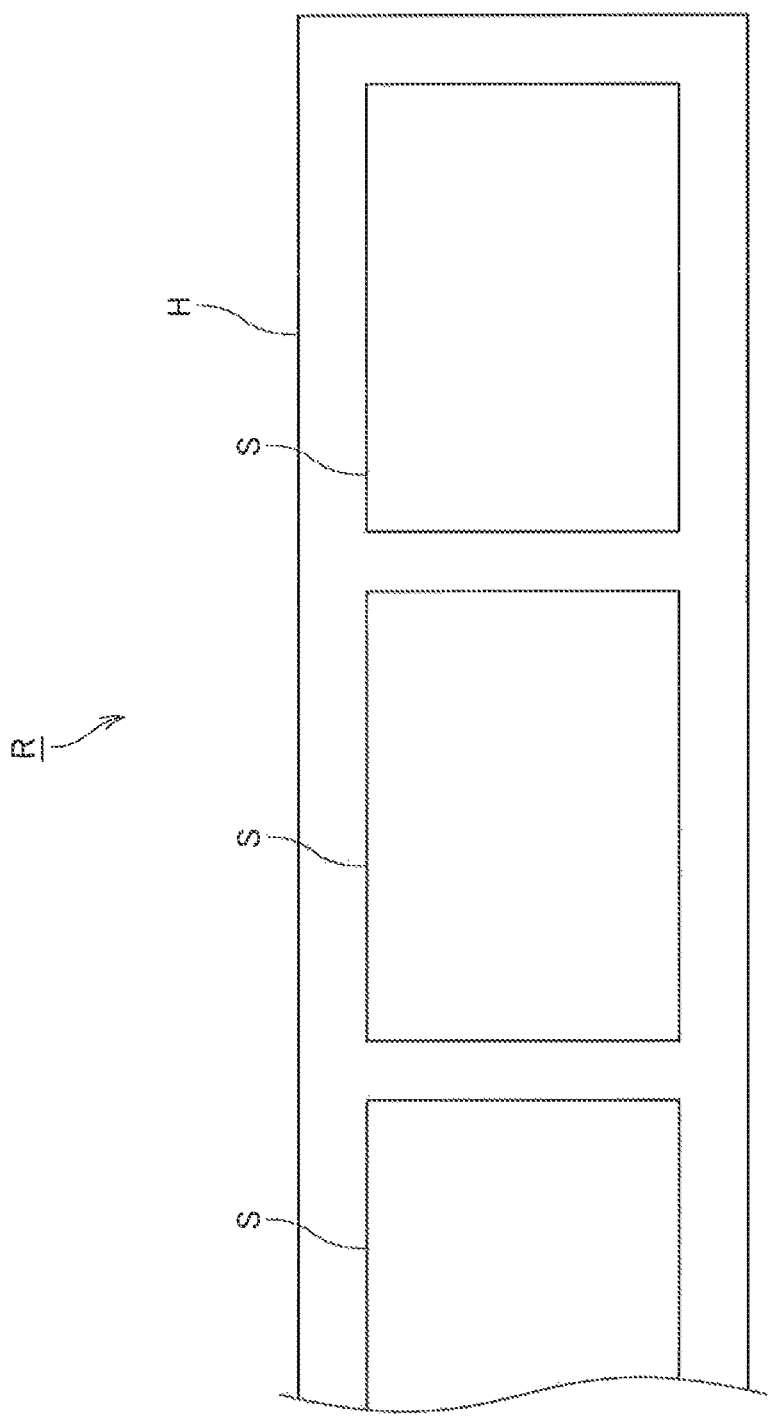
FIG. 2 illustrates label paper.

FIG. 2 shows an example of label paper R. As shown in FIG. 2, the label paper R has labels S affixed with a gap therebetween to a continuous liner sheet H. The back side of each label S is coated with adhesive, and the labels S can be individually peeled from the liner sheet H.

The printer 10 can also print continuously to the labels S on the liner sheet H.

As shown in FIG. 1, the printer 10 has a control unit 15, a storage unit 16, a print unit 17, a network communication unit 18 (first communication unit), an interface 19 (second communication unit), and a display unit (not shown in the figure).

The control unit 15 includes a CPU, ROM, RAM, and other peripheral circuits, and controls various parts of the printer 10. The function blocks of the control unit 15 include a configuration unit 15a and print control unit 15b, which are further described below.

The storage unit 16 is EEPROM or other nonvolatile memory, and stores data rewritably. The storage unit 16 stores a font A table TA, a font B table TB, a font C table TC, and an adjustment ratio table KT, which are further described below.

The print unit 17 has a mechanism for conveying recording media including the label paper R described above, and an inkjet head, and prints images on the recording media as controlled by the control unit 15.

The network communication unit 18 includes a communication module that conforms to a specific communication protocol, and communicates through the Internet, the telephone network, an intranet, or other network with external devices on the network (including the terminal 11) as controlled by the control unit 15. In some embodiments of the invention, the network communication unit 18 and control unit 15 work together to function as a communication unit.

The interface 19 communicates according to a specific communication protocol with the host computer 12 as controlled by the control unit 15.

The printer 10 also has a display unit such as an LCD panel or other type of display panel, and displays images on the display panel as controlled by the control unit 15.

The terminal 11 is an information processing device such as a desktop computer, notebook computer, tablet computer, or a handheld terminal device. More particularly, the terminal 11 may be any type of computing device on which a web browser is installed.

As shown in FIG. 1, the terminal 11 includes a terminal control unit 23, a terminal display unit 24, an input unit 25, a network communication unit 26, and a terminal storage unit 27.

The terminal control unit 23 includes CPU, ROM, RAM, and other peripheral circuits, and controls various parts of the terminal 11.

One function block of the terminal control unit 23 is a browser execution unit 23a, which is further described below.

The terminal display unit 24 has a display panel 24a such as an LCD panel, and displays images on the display panel 24a as controlled by the terminal control unit 23.

The input unit 25 is connected to a mouse, keyboard, touch panel, operating keys, or other input devices, and detects and outputs input to the input devices to the terminal control unit 23.

The network communication unit 26 communicates with the printer 10 over the network according to a specific communication protocol as controlled by the terminal control unit 23.

The terminal storage unit 27 includes nonvolatile memory, and stores data rewritably.

The host computer 12 is a device that controls the printer 10.

As shown in FIG. 1, the host computer 12 includes a host control unit 30, a host display unit 31, a host input unit 32, a interface 33, and a host storage unit 34.

The host control unit 30 includes a CPU, ROM, RAM, and other peripheral circuits, and controls parts of the host computer 12. Function blocks of the host control unit 30 include an application execution unit 30a and a printer driver execution unit 30b as further described below.

The host display unit 31 has a display panel such as an LCD panel, and displays images on the display panel as controlled by the host control unit 30.

The host input unit 32 is connected to a mouse, keyboard, touch panel, operating keys, or other input devices, and detects and outputs input to the input devices to the host control unit 30.

The interface 33 communicates with the printer 10 according to a specific communication protocol as controlled by the host control unit 30.

A connection is opened according to a specific communication protocol such as TCP, and a logical communication path is established between the printer 10 and terminal 11. The printer 10 and terminal 11 exchange data through this communication path.

A link conforming a communication standard is also opened and a logical communication path is established between the printer 10 and the host computer 12. For example, if the printer 10 and host computer 12 communicate using the USB standard, a link conforming to the USB standard is opened and a communication path is established. The printer 10 and the host computer 12 exchange data through this communication path.

In this example, a different printer (other printer) was connected to the host computer 12 before printer 10 is connected. This other printer is referred to below as the "replaced printer." As described below, the printer 10 according to some embodiments of the invention has a function for emulating the replaced printer, and can print images based on the print instruction data used to control the replaced printer. As a result, regardless of the content of the print instruction data output by the host computer 12 before and after the replaced printer is replaced with the new printer 10, there is no need to modify the software of the host computer 12 when replacing the printer, and the task of replacing a printer is simple.

More specifically, some embodiments of the invention can produce substantially identical printouts when printing text with the replaced printer and when printing the same text with the new printer 10 as further described below.

The printer 10 according to this embodiment stores font data for each printable character, and prints characters based on the font data.

A "character" as used in some embodiments of the invention means anything that can be printed based on the font data. For example, when font data for a white space (such as a space or tab) that does not involve forming a dot is stored, this white space character is also considered a character.

Operation of the host computer 12 and printer 10 when printing a character is described below.

Figure 3:
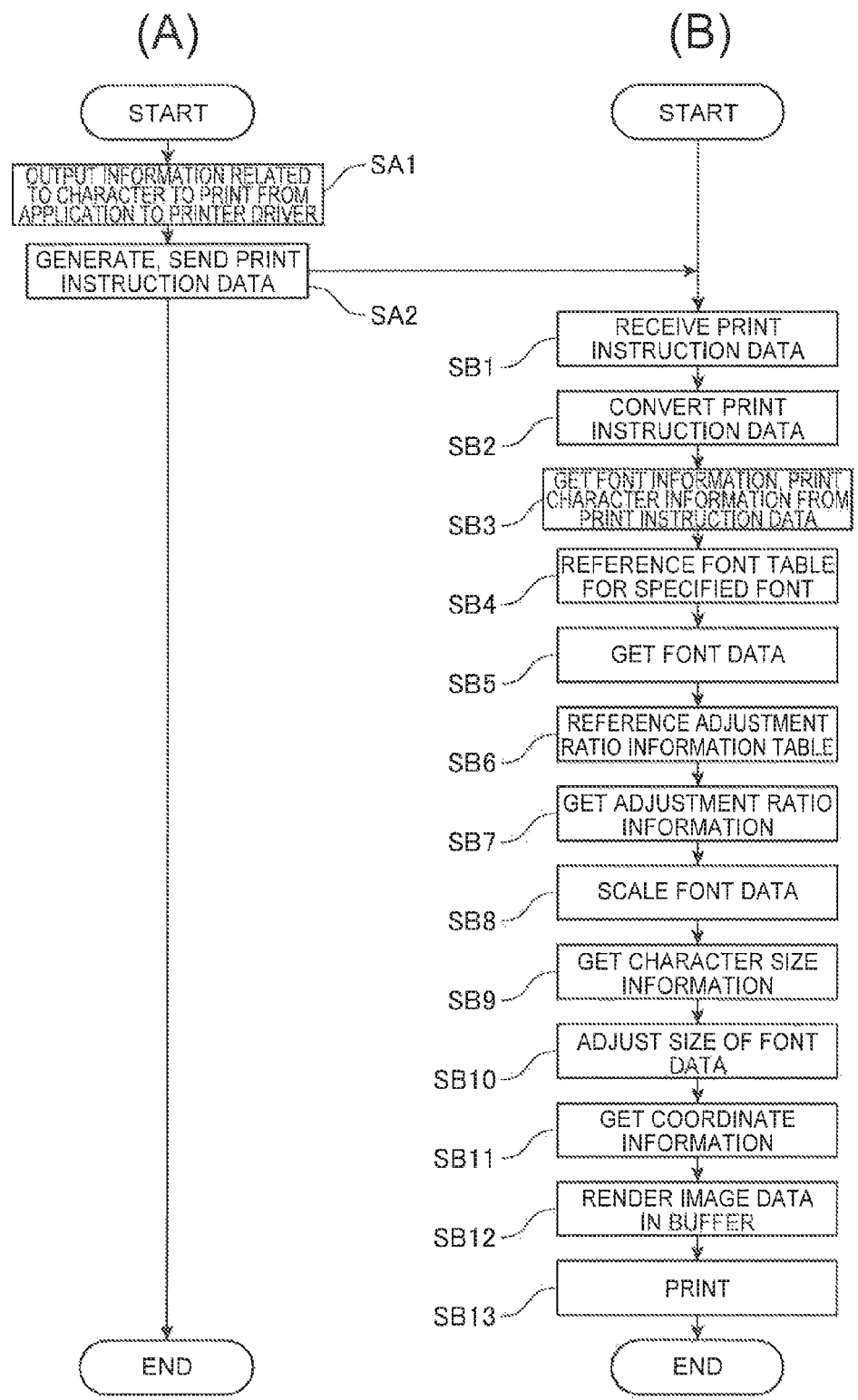
FIG. 3 is a flow chart showing the operation of a host computer and printer.

FIG. 3 is a flowchart showing the operation of the host computer 12 and printer 10 when printing a character. Column (A) in FIG. 3 shows the operation of the host computer 12, and column (B) in FIG. 3 shows the operation of the printer 10.

The following description assumes that label paper R as shown in FIG. 2 is loaded in the printer 10, and the letter A is printed to one label S.

As shown in FIG. 3, the application execution unit 30a of the host computer 12 generates information related to an image to print, and outputs to the printer driver execution unit 30b (step SA1).

The information related to the image to print includes information specifying the character to print (the letter A in this example), information indicating the size of the character when the character is printed, and information indicating where to print the character on the label S. More specifically, the information related to the image to print includes the information required to generate the print instruction data described below.

The application execution unit 30a generates the information related to the image to print based on information input through a specific user interface. The application execution unit 30a is a function block of which the function is rendered by executing a previously installed application. The printer driver execution unit 30b is also a function block of which the function is rendered by executing a previously installed printer driver.

Next, the printer driver execution unit 30b generates and sends print instruction data instructing printing the letter A to the printer 10 (step SA2).

Note that as described above, when the printer connected to the host computer 12 is changed from the replaced printer to the printer 10 according to this embodiment, the application and printer driver installed on the host computer 12 are not modified. Therefore, the control command (print instruction data) that is generated and sent by the process of step SA2 is a command conforming to the command language of the replaced printer. More specifically, there is no need to change the application or printer driver when replacing a printer with the new printer 10, and replacing the printer is therefore easy.

Figure 4:
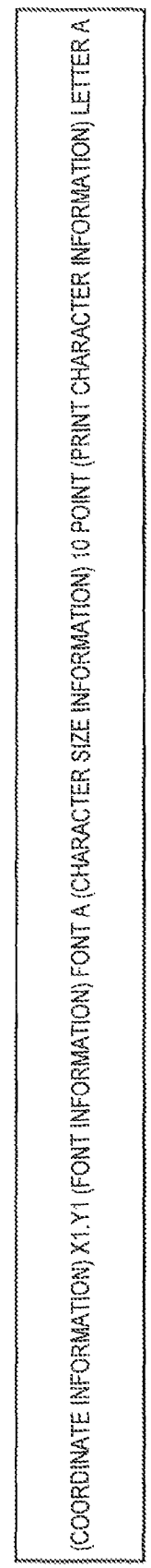
FIG. 4 illustrates the content of print instruction data.

An example of the content of the information contained in the print instruction data is shown in FIG. 4.

As shown in FIG. 4, the print instruction data includes at least coordinate information, font information, character size information, and print character information (information identifying which character to print).

The coordinate information is information specifying the coordinates of the position where the character is to be printed on the label S.

The font information is information specifying the font. In this example, the replaced printer described above was compatible with three fonts, font A, font B, and font C. The printer 10 according to this embodiment is also compatible with three fonts, font A, font B, and font C, and stores a font table (described below) for each of these fonts.

The character size information is information specifying the size of the printed character. In this example, the replaced printer was configured to specify the size of a character using the known as points. To print a character, the replaced printer scaled the font data for the character by a specific ratio vertically and horizontally based on the specified point size, and printed the character based on the scaled font data. As a result, the size of the printed character was adjusted according to the specified point size. In one example, the replaced printer stored information for a 10-point size linked to information for scaling the font data 1.2 times vertically and 1.2 times (also denoted 1.2× below) horizontally. The replaced printer also stored information for a 20-point size linked to information for scaling the font data 2.0 times vertically and 1.8 times horizontally. When 10 point is specified as the character size, the replaced printer scales the corresponding font data 1.2 times vertically and 1.2 times horizontally, and then prints the character based on the adjusted (scaled) font data.

Scaling the font data 1.2 times vertically and 1.2 times horizontally means that data with a specified size of 10 dots vertically by 10 dots horizontally, for example, is scaled (in this instance, enlarged) to 12 dots vertically by 12 dots horizontally. Scaling font data is done using a known image processing method.

In another example, when 20 point is specified as the character size, the replaced printer scales the corresponding font data 2 times vertically and 1.8 times horizontally, and then prints the character based on the adjusted (scaled) font data.

Note that the replaced printer is not limited to a configuration that stores a scaling ratio for point sizes, and may be a configuration that calculates the vertical height and horizontal width according to the point size.

The print character information (information specifying a character to print) is information specifying the character or the string to print. Each character is expressed as a Unicode or ASCII character code, for example.

As shown in FIG. 3, when print instruction data is received (step SB1), the print control unit 15*b* of the control unit 15 of the printer 10 converts the print image data to print instruction data conforming to the command language of the printer 10 (step SB2). Below, the print instruction data after conversion by the process of step SB2 is referred to as the "converted print instruction data." The print control unit 15*b* (control unit) has an emulation function for converting input data intended for the replaced printer (other printer) received from the host computer 12 to data compatible with the printer 10. The print control unit 15*b* also has an emulation function for converting output data to the host computer 12 to data compatible with the host computer 12.

The specific process executed by the print control unit 15*b* from step SB3 is performed by the converted print instruction data being read and executed by a function of firmware or other program.

Next, the print control unit 15*b* gets the font information and print character information contained in the converted print instruction data (step SB3).

Next, the print control unit 15*b* references the font table corresponding to the font indicated by the acquired font information (step SB4).

The font data is the actual data representing a character in a format that can be recorded on the recording medium, and in this embodiment is bitmap font data. The font data could be scalable font data, vector font data, or outline font data, for example, instead of bitmap font data. The font table is a table storing font data for each printable character in sets. As described above, a font A table TA for font A, a font B table TB for font B, and a font C table TC for font C are stored in the storage unit 16 of the printer 10 according to this embodiment. For example, font data for font A is stored in the font A table TA for each printable character.

For example, if the font identified by the font information acquired in step SB3 is font A, the print control unit 15*b* references font A table TA in step SB4.

Next, based on the font table referenced in step SB4, the print control unit 15*b* gets the font data for the character (the letter A in this example) indicated by the print character information acquired in step SB3 (step SB5). A conversion table storing the relationship between a character code and the address in memory where the font data of the character indicated by the character code is stored in the font table is stored in the storage unit 16. This conversion table stores this relationship information for each character code in each font. The print control unit 15*b* acquires the font data for each character indicated by the print character information using this conversion table.

Next, the print control unit 15*b* references the adjustment ratio table KT stored in the storage unit 16 (step SB6).

FIG. 5 shows an example of the adjustment ratio table KT.

As shown in FIG. 5, the adjustment ratio table KT is a table storing adjustment ratio information for each of fonts A, B, and C for three device models, models K1 to K3.

The models stored in the adjustment ratio table KT refer to the models of replaced printers (other printers) that can be emulated. The printer 10 according to this embodiment is thus configured to emulate three models, models K1 to K3.

The adjustment ratio information is information indicating the ratio used to scale the font data vertically (referred to below as the vertical ratio) and the ratio used to scale font data horizontally (referred to below as the horizontal ratio). The vertical ratio and horizontal ratio are generally referred to as adjustment ratios. For example, if the vertical ratio is 1.2 times and the horizontal ratio is 1.2 times, the size of font data that is 20 dots tall and 10 dots wide becomes 24 dots tall and 12 dots wide after scaling. Scaling font data based on the adjustment ratio can be appropriately handled by a known image processing method used to scale data.

The adjustment ratio information for each font for each model in the adjustment ratio table KT is defined as described below.

In this example, the replaced printer identified as model K1, the replaced printer identified as model K2, and the replaced printer identified as model K3 each store font tables for three fonts, font A, font B, and font C. In this example, the size of the font data is not the same for each of the same fonts stored in the three replaced printers. For example, the size of the font data of font A stored by the replaced printer of model K1 is 24 dots high by 12 dots wide, and the size of the font data of font A stored by the replaced printer of model K2 is 20 dots high by 10 dots wide.

The size of the font data stored by the printer 10 according to some embodiments of the invention is also not the same as the size of the font data stored by each of the replaced printer models. For example, the size of the font data for font A in printer 10 is 20 dots high by 10 dots wide, but the size of the font data for font A in the replaced printer of model K1 is 24 dots high by 12 dots wide. The same applies to font B and font C.

The adjustment ratios (vertical ratio, horizontal ratio) for each font of each model in the adjustment ratio table KT is determined from the need to eliminate the mismatch between the size of the font data for the same font between the printer 10 and each model of replaced printer that is emulated. As a result, the size of the characters is substantially the same when the replaced printer prints a character and the printer 10 according to this embodiment prints the same character in the same font, and the final printout is therefore substantially the same before and after the printer is replaced.

More specifically, the font size of the font data for font A in printer 10 according to this embodiment is 20 dots high by 10 dots wide. The font size of the font data for font A in the replaced printer of model K1 is 24 dots high by 12 dots wide. Therefore, by scaling the font data for font A in printer 10 1.2 times vertically and 1.2 times horizontally, the size of the font data for font A will be the same when printed by the printer 10 according to some embodiments of the invention and the replaced printer of model K1. The adjustment ratio information of font A when emulating model K1 is therefore information indicating a vertical ratio of 1.2× and a horizontal ratio of 1.2× as shown in FIG. 5.

Similarly, the font size of the font data for font A in the replaced printer of model K2 is 20 dots high by 8 dots wide. Therefore, by scaling the font data for font A in printer 10 1.0 times vertically and 0.8 times horizontally, the size of the font data for font A will be the same when printed by the printer 10 and the replaced printer of model K2. The adjustment ratio information of font A when emulating model K2 is therefore information indicating a vertical ratio of 1.0× and a horizontal ratio of 0.8× as shown in FIG. 5.

Similarly, the font size of the font data for font A in the replaced printer of model K3 is 18 dots high by 12 dots wide. Therefore, by scaling the font data for font A in printer 10 0.9 times vertically and 1.2 times horizontally, the size of the font data for font A will be the same when printed by the printer 10 and the replaced printer of model K3. The adjustment ratio information of font A when emulating model K3 is therefore information indicating a vertical ratio of 0.9× and a horizontal ratio of 1.2× as shown in FIG. 5.

After referencing the adjustment ratio table KT stored in the storage unit 16 in step SB6, the print control unit 15*b* gets the adjustment ratio information for the font indicated by the font information contained in the converted print instruction data and corresponding to a predetermined model (step SB7).

The predetermined model as used here is the model of the replaced printer that was connected to the host computer 12 before being replaced with the printer 10 according to some embodiments the invention. More specifically, the predetermined model is the model of the replaced printer that the printer 10 emulates. Information identifying the model is stored in a specific variable of the program rendering the function of the print control unit 15*b*, and the print control unit 15*b* can thereby acquire the model of the replaced printer being emulated.

For example, the font information contained in the converted print instruction data identifies font A as the font, and the predetermined model as model K1. In this event, the print control unit 15*b* gets the adjustment ratio information for font A and model K1 in step SB7 after referencing the adjustment ratio table KT in step SB6.

Next, the print control unit 15*b* scales the font data acquired in state SB5 using the ratios indicated by the adjustment ratio information acquired in step SB7 (step SB8).

More specifically, for example, let the content of the adjustment ratio table KT be the content shown in FIG. 5, and the adjustment ratio information acquired in step SB8 be the information for font A and model K1. In this event, the adjustment ratio information indicates the vertical ratio is 1.2× and the horizontal ratio is 1.2×. In step SB8, the print control unit 15*b* scales the font data (20 dots high by 10 dots wide) for the letter A acquired in step SB5 based on the adjustment ratio information 1.2× vertically and 1.2× horizontally. More specifically, the print control unit 15*b* scales the font data and generates font data that is 24 dots vertically (20 dots×1.2) and 12 dots horizontally (10 dots×1.2). As described above, scaling the font data based on the adjustment ratio is handled appropriately by a known image processing method related to scaling data.

The size of the font data output by the scaling process of step SB8 is the same size as the font data of the same font printed by the replaced printer of the emulated model.

Next, the print control unit 15*b* gets the character size indicated by the character size information contained in the converted print instruction data (step SB9). As described above, the character size is expressed using points as the unit.

Next, the print control unit 15*b* adjusts the size of the font data scaled in step SB8 according to the character size indicated by the character size information (step SB10). For example, if the character size indicated by the character size information is 10 points, the print control unit 15*b* adjusts the size of the character to 10 points based on the font data in step SB10.

Next, the print control unit 15*b* gets the coordinates indicated by the coordinate information contained in the converted print instruction data (step SB11).

Next, the print control unit 15*b* renders the font data that was scaled based on the adjustment ratio information and then adjusted based on the character size information to the position corresponding to the coordinates acquired in step SB11 in an image buffer not shown (step SB12).

Next, the print control unit 15*b* controls the print unit 17 to print the letter A based on the image data rendered in the image buffer (the font data for the letter A in this example) (step SB13).

Because the printer 10 prints characters as described above, the size of characters printed by the printer 10, and the size of characters printed by the replaced printer emulated by the printer 10, are the same. As a result, when the printer 10 prints a character, the printout is substantially the same as when the character is printed by the replaced printer.

The configuration unit 15*a* is described next.

A web server program (such as Apache HTTP Server) is installed on the printer 10. The printer 10 can function as a web server that generates and outputs display data according to a specific protocol such as HTTP in response to a request from a client terminal 11.

A web application is also installed on the printer 10. The configuration unit 15*a* is a function block rendered by a function of the web application. More specifically, the function of the configuration unit 15*a* is achieved by the cooperation of hardware and software, such as a CPU reading and running a web application and related programs.

As described below, the control system 1 according to this embodiment can change the adjustment ratio information and adjustment ratio from the terminal 11 using functions of the configuration unit 15a. More specifically, some embodiments of the invention enable the user to easily change specific adjustment ratio information without performing a complicated process.

Figure 6:
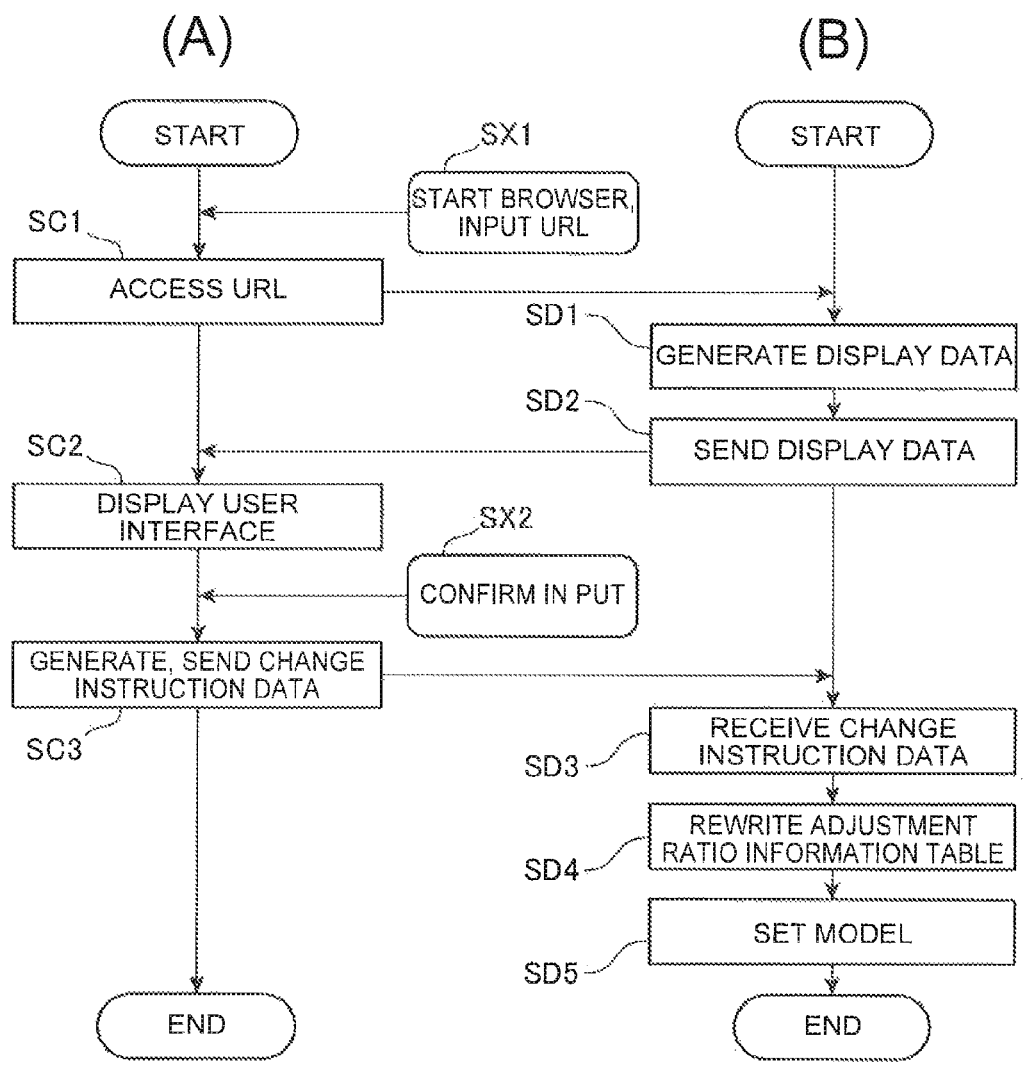
FIG. 6 is a flow chart showing the operation of a terminal and printer.

FIG. 6 is a flow chart showing the operation of the terminal 11 and the operation of the printer 10 when changing the adjustment ratio indicated by the adjustment ratio information. Column (A) shows the operation of the terminal 11, and column (B) shows the operation of the printer 10.

To change the adjustment ratio, the user starts the web browser on the terminal 11 and inputs a specific URL of the printer 10 as the address to access (step SX1). The URL is previously made known to the user.

The browser execution unit 23a of the terminal control unit 23 of the terminal 11 then works with the network communication unit 26 to establish a logical communication path with the printer 10, and accesses the URL input by the user (step SC1). The browser execution unit 23a is a function block whose function is rendered by the web browser.

In response to being accessed in step SC1, the configuration unit 15a of the control unit 15 of the printer 10 then generates display data written in HTML, for example, for displaying a user interface UI1 (described below) (step SD1), and then sends the display data to the terminal 11 (step SD2).

The browser execution unit 23a of the terminal 11 then displays the user interface UI1 in a browser window based on the received display data (step SC2).

Figure 7:
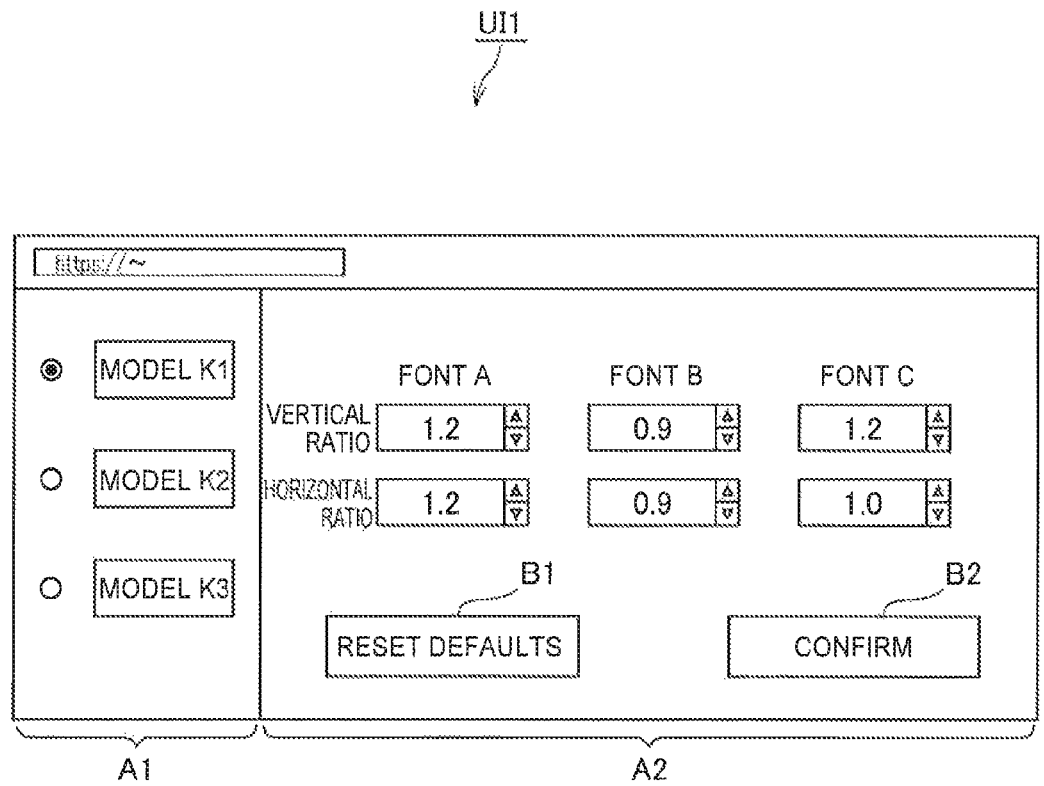
FIG. 7 illustrates an example of a user interface.

FIG. 7 shows an example of the user interface UI1.

The user interface UI1 is a screen for setting the adjustment ratio information used by a particular model in the adjustment ratio table KT. In step SB7 described above, the print control unit 15b acquires the adjustment ratio information set for a particular model (the predetermined model) through the user interface UI1. The user interface UI1 also enables the user to change the values of the adjustment ratio information set for each font used by each model.

As shown in FIG. 7, the left side of the user interface UI1 has an area A1 for selecting the model. The models that can be selected are shown in area A1. A radio button is presented for each model, and only one model at a time can be selected for editing. The user selects the model of the replaced printer that the printer 10 emulates from this area A1.

Another area A2 is also formed on the right side of the area A1 in the user interface UI1. The adjustment ratio (vertical ratio and horizontal ratio) is displayed for each font appropriate to the model selected in area A1. The value of the adjustment ratio for each font is based on the adjustment ratio table KT stored in the storage unit 16 of the printer 10. More specifically, to generate the display data in step SD1, the configuration unit 15a references the adjustment ratio table KT, gets the adjustment ratio of each font for each model, and generates the display data based on the acquired adjustment ratios. The content displayed in area A2 changes as the model selected in area A1 changes, and adjustment ratios are displayed for each font used by the selected model.

As shown in FIG. 7, each of the adjustment ratios displayed in area A2 of the user interface UI1 can be changed. More specifically, buttons enabling changing the adjustment ratio in increments of 0.1 are displayed on the right side of each adjustment ratio field, and the user can operate these buttons to change the value of the desired adjustment ratio.

A reset defaults button B1 is also presented in area A2 as shown in FIG. 7. When the reset defaults button B1 is operated, each of the adjustment ratios for the model selected in area A1 are reset to the default values. Each of the default values is set precisely through previous simulations and tests to eliminate any mismatch in the size of font data for any same font between the printer 10 and the replaced printer of the selected model.

A confirm button B2 is also provided in area A2. Operating the confirm button B2 confirms the selection of the model by the user, and the adjustment ratio settings for the selected model.

Referring again to FIG. 6, when the user operates the confirm button B2 in the user interface UI1 (step SX2), the browser execution unit 23a generates and sends change instruction data by means of a function of a script contained in the display data (step SC3).

Included in this change instruction data are at least information identifying the model selected by the user in the user interface UI1 (specified model), information indicating the adjustment ratio set by the user, and information instructing changing the adjustment ratio information in the adjustment ratio table KT.

As shown in FIG. 6, when change instruction data is received (step SD3), the configuration unit 15a of the printer 10 rewrites the content of the adjustment ratio table KT based on the content of the change instruction data. For example, if the adjustment ratio of font A for model K1 is set to 1.5× vertically and 1.5× horizontally, the configuration unit 15a rewrites the corresponding adjustment ratio information stored in the adjustment ratio table KT to the set content (step SD4).

In addition, the configuration unit 15a sets the adjustment ratio information corresponding to the model specified in the data (the model selected by the user) based on the content of the change instruction data as the adjustment ratio information to use (step SD5). More specifically, the configuration unit 15a stores information identifying the specified model to a specific program variable that stores information identifying the model of a replaced printer emulated by the printer 10. As a result, the print control unit 15b can retrieve the adjustment ratio information corresponding to the specified model (=the model selected by the user) in step SB7 described above.

Some embodiments of the invention thus enable changing the adjustment ratio indicated by the adjustment ratio information from a terminal 11 on which a common web browser is installed. As a result, the user can change the adjustment ratio without going through a difficult process of installing a dedicated software tool on the terminal 11, for example. More specifically, because a user interface UI1 is provided by a function of the printer 10, values in the adjustment ratio information can be set by the simple operation of inputting information through the user interface UI1.

As described above, the control unit 15 (print control unit 15b) of a printer 10 according to some embodiments of the invention receives print instruction data including information specifying a character, scales the font data for the specified character at a ratio indicated by adjustment ratio information, and then controls the print unit 17 to print the character based on the scaled font data.

This configuration enables adjusting the size of text that is printed based on font data without depending on control by a host computer 12.

A font table is stored for each font in the storage unit 16 in some embodiments of the invention. Adjustment ratio information is also relationally stored for each font in the adjustment ratio table KT stored in the storage unit 16. The control unit 15 (print control unit 15*b*) receives print instruction data containing font and character information, scales the font data for the specified character stored in the font table for the specified font at the ratio indicated by the adjustment ratio information for the specified font, and then drives the print unit 17 to print based on the scaled font data.

This configuration enables adjusting the size of the characters printed based on the font data for each font.

Character size information identifying the printed size of the specified character is also contained in the print instruction data in some embodiments of the invention. After scaling the font data to the ratio indicated by the adjustment ratio information, the control unit 15 (print control unit 15*b*) also adjusts the size based on the character size information, and drives the print unit 17 to print the character based on the adjusted font data.

After adjusting the size of the font data based on the adjustment ratio information, this configuration enables further adjusting the size based on the character size information contained in the print instruction data.

When a change instruction commanding to change the adjustment ratio indicated by the adjustment ratio information is received from a terminal 11 that is connected to and communicates with the control unit 15 (configuration unit 15*a*), the control unit 15 (configuration unit 15*a*) in some embodiments of the invention also changes the adjustment ratio values indicated by the adjustment ratio information.

This configuration enables changing the adjustment ratio indicated by the adjustment ratio information desirably from an external terminal 11.

The control unit 15 in some embodiments of the invention has a function for emulating the replaced printer (other printer), and controlling the print unit to print based on print instruction data related to controlling the replaced printer (other printer). The adjustment ratio table KT stored in the storage unit 16 stores adjustment ratio information for each font linked to the model of the replaced printer that can be emulated by the control unit 15. When a change instruction and an instruction identifying the model of the replaced printer are received from the terminal 11, the control unit 15 (configuration unit 15*a*) sets the adjustment ratio information corresponding to the specified model as the adjustment ratio information to be used.

As a result, using the ability to emulate the replaced printer, this configuration enables the control unit 15 to scale font data at the ratio set for the model of the replaced printer to be emulated.

A web browser is also installed on the terminal 11 according to this embodiment. When accessed from the browser execution unit 23*a* of the terminal 11, the control unit 15 (configuration unit 15*a*) sends display data for displaying a user interface UI1 that accepts the model selection to the web browser of the terminal 11.

This configuration enables the user to select a model using a terminal having an installed web browser, and does not need to install a dedicated software tool, for example, on the terminal 11.

At least one embodiment of the present invention is described above with reference to a preferred embodiment thereof, but the invention is not limited thereto and can be modified and adapted in many ways without departing from the scope of the accompanying claims.

For example, a configuration in which the printer 10 accesses an external server that is connected to and communicates with the printer 10, acquires necessary information therefrom, and updates the content of the adjustment ratio table KT is also conceivable. For example, adjustment ratio information for each font of a new model could be managed on the external server. At a specific time, the configuration unit 15*a* of the printer 10 accesses the external server and gets the adjustment ratio information for each font of the new model. Next, based on the acquired information, the configuration unit 15*a* adds the adjustment ratio information for each font of the new model to the adjustment ratio table KT. This configuration enables a printer 10 to produce printouts that are substantially identical when printing text even when emulating a new model of replaced printer.

Function blocks shown in FIG. 1 can be embodied by the cooperation of hardware and software, and do not suggest a specific hardware configuration. In addition, functions of the printer 10 may be rendered by a separate device externally connected to the printer 10. The printer 10 may also execute the foregoing processes by running a program stored on an externally connected storage medium.

At least one embodiment of the present invention being thus described, it will be obvious that it may be varied in many ways. Such variations are not to be regarded as a departure from the spirit and scope of the invention, and all such modifications as would be apparent to one skilled in the art are intended to be included within the scope of the following claims.

What is claimed is:

1. A printer comprising:
a print unit configured to print an image on a recording medium;
a storage unit configured to store a font table containing font data representing characters for printing on the recording medium and store adjustment ratio information specifying a ratio used to scale the size of the font data stored in the font table;
a first communication unit configured to receive print instruction data conforming to command language of another printer replaced by the printer, the print instructions data including information specifying a character and font information specifying a font;
a second communication unit configured to receive a change instruction instructing changing a ratio specified by the adjustment ratio information; and
a control unit configured to convert the print instructions data to font data based on the font information, scale the font data of the specified character at the ratio specified by the font information and a model of the replaced printer, and control the print unit to print the specified character based on the scaled font data.

2. The printer described in claim 1, wherein: the storage unit stores a font table for each font, and stores adjustment ratio information for each font; the print instruction data includes information specifying a font; and the control unit scales the font data of the specified character stored in the font table of the specified font at the ratio specified by the adjustment ratio information, and controls the print unit to print based on the scaled font data.

3. The printer described in claim 1, wherein: the print instruction data includes character size information specifying the printed size of the specified character; and the control unit adjusts the size of the font data scaled at the ratio specified by the adjustment ratio information based on the character size information, and controls the print unit to print the character based on the adjusted font data.

4. The printer described in claim 1, wherein: the second communication unit receives a change instruction instructing changing the ratio specified by the adjustment ratio information from an information processing device that connects to and communicates with the second communication unit; and the control unit changes the ratio specified by the adjustment ratio information based on the change instruction.

5. The printer described in claim 4, wherein: the storage unit stores adjustment ratio information according to the model of another printer to be emulated; and the control unit has a function for emulating the other printer, and controlling the print unit to print based on the print instruction data related to controlling the other printer, and when the second communication unit receives selection of a model of other printer and the change instruction from the information processing device, sets the adjustment ratio information corresponding to the selected model as the adjustment ratio information to be used.

6. The printer described in claim 5, wherein: a web browser is installed on the information processing device; and the control unit sends display data for displaying a user interface that accepts selection of a model to the web browser of the information processing device when accessed from the web browser of the information processing device.

7. A control system comprising:
a host computer;
an information processing device; and
a printer including a print unit configured to print an image on a recording medium, a storage unit configured to store a font table containing font data representing characters for printing on the recording medium and store adjustment ratio information specifying a ratio used to scale the size of the font data stored in the font table, a first communication unit configured to receive print instruction data conforming to command language of another printer replaced by the printer, the print instructions data including information specifying a character and font information specifying a font, a second communication unit configured to receive a change instruction instructing changing a ratio specified by the adjustment ratio information, and a control unit configured to convert the print instructions data to font data based on the font information, scale the font data of the specified character at the ratio specified by the font information and a model of the replaced printer, and control the print unit to print the specified character based on the scaled font data.

8. The control system described in claim 7, wherein: the storage unit of the printer stores a font table for each font, and stores adjustment ratio information for each font; the print instruction data includes information specifying a font; and the control unit of the printer scales the font data of the specified character stored in the font table of the specified font at the ratio specified by the adjustment ratio information, and controls the print unit to print based on the scaled font data.

9. The control system described in claim 7, wherein: the print instruction data includes character size information specifying the printed size of the specified character, and the control unit of the printer adjusts the size of the font data scaled at the ratio specified by the adjustment ratio information based on the character size information, and controls the print unit to print the character based on the adjusted font data.

10. The control system described in claim 7, wherein: the second communication unit of the printer receives a change instruction instructing changing the a ratio specified by the adjustment ratio information from an information processing device that connects to and communicates with the second communication unit; and the control unit of the printer changes the ratio specified by the adjustment ratio information based on the change instruction.

11. The control system described in claim 10, wherein: the storage unit of the printer stores adjustment ratio information for each font according to the model of another printer to be emulated; the control unit of the printer has a function for emulating another printer, and controlling the print unit to print based on the print instruction data related to controlling the other printer; the information processing device sends a selection of a model of another printer with the change instruction to the printer, and the control unit of the printer sets the adjustment ratio information corresponding to the selected model as the adjustment ratio information to be used when the second communication unit receives selection of a model of other printer and the change instruction from the information processing device.

12. The control system described in claim 11, wherein: the printer functions as a web server to the information processing device, and sends display data for displaying a user interface that accepts selection of a model to the information processing device when accessed from the information processing device; a web browser is installed on the information processing device; and when the display data is received from the printer, the information processing device displays the user interface based on the received display data.

13. A printer for printing an image on a recording medium, the printer comprising:
a memory arranged to store a font table containing font data representing characters for printing on the recording medium, the memory arranged to store adjustment ratio information specifying a ratio used to scale the size of the font data stored in the font table;
a communication interface arranged to receive print instruction data conforming to command language of another printer replaced by the printer, the print instructions data including information specifying a character and font information specifying a font and a change instruction instructing changing a ratio specified by the adjustment ratio information; and
a processor arranged to convert the print instructions data to font data based on the font information, scale the font data of the specified character at the ratio specified by the font information and a model of the replaced printer, and control the print unit to print the specified character based on the scaled font data.

* * * * *